United States Patent [19]
Joyner, Jr.

[11] Patent Number: 5,089,760
[45] Date of Patent: Feb. 18, 1992

[54] DC BUS VOLTAGE REGULATION BY CONTROLLING THE FREQUENCY IN A VARIABLE FREQUENCY INVERTER

[75] Inventor: F. Carl Joyner, Jr., Columbia, S.C.
[73] Assignee: Square D Company, Palatine, Ill.
[21] Appl. No.: 349,890
[22] Filed: May 5, 1989

Related U.S. Application Data

[63] Continuation of Ser. No. 940,171, Dec. 10, 1986, abandoned.

[51] Int. Cl.$^5$ .............................................. H02P 5/40
[52] U.S. Cl. .................................... 318/798; 318/806
[58] Field of Search ........ 318/798, 805, 806, 807–812; 388/819

[56] References Cited

U.S. PATENT DOCUMENTS

| | | | |
|---|---|---|---|
| 3,331,003 | 7/1967 | King . | |
| 3,500,158 | 3/1970 | Landau et al. | 318/805 |
| 3,718,851 | 2/1973 | Graf et al. | 318/806 |
| 3,753,063 | 8/1973 | Graf . | |
| 4,096,422 | 6/1978 | Fleming et al. | 388/819 |
| 4,158,163 | 6/1979 | Eriksen | 318/798 |
| 4,317,074 | 2/1982 | Erth | 318/808 |
| 4,366,427 | 12/1982 | Walker et al. | 318/807 |
| 4,437,050 | 3/1984 | Overzet | 318/798 |
| 4,442,394 | 4/1984 | Beierholm et al. | 318/807 |
| 4,454,930 | 6/1984 | Nomura et al. | 187/29 R |
| 4,525,660 | 6/1985 | Katto | 318/805 |

*Primary Examiner*—David Smith, Jr.
*Attorney, Agent, or Firm*—Michael J. Femal; Hugh M. Gilroy

[57] ABSTRACT

The invention is a direct current bus voltage regulator for an alternating current inverter, where draws direct current from a DC bus, and the inverter supplies alternating current having a controlled frequency to an AC motor. The alternating current frequency controlled by a signal received through a precedence determining circuit that determines which signal will control the AC current frequency. This circuit receives signals from a ramp generator, an AC current limiting circuit and a DC bus voltage sensing circuit. The precedence determining circuit passes the signal with the highest priority on to a voltage control oscillator which in turn controls the AC current frequency delivered to the AC motor, thereby controlling the motor speed. The ramp generator signal indicates an operator input motor control command and has the lowest priority of the three signals. The AC current limiting circuit has second priority and indicates that current flow between the inverter and the AC motor is greater than a predetermined current value. The DC bus voltage signal, which has the highest priority, indicates the presence of a DC bus voltage greater than a predetermined value of DC bus voltage. During the deceleration of an AC motor electric power is generated. This generated power is fed back into the DC bus causing it to overshoot the predetermined DC bus voltage value. By permitting the DC bus voltage signal to have first priority in controlling the motor speed during deceleration, overshoot of the DC bus voltage can be eliminated thereby reducing the chance of damage to electrical components of the motor control device.

24 Claims, 8 Drawing Sheets

FIG. 7

DC BUS VOLTAGE REGULATION BY CONTROLLING THE FREQUENCY IN A VARIABLE FREQUENCY INVERTER

This application is a continuation of application Ser. No. 06/940,171, filed Dec. 10, 1986, now abandoned.

FIELD OF THE INVENTION

This invention relates to direct current bus voltage regulators, particularly to voltage regulators for the bus of an inverter for converting direct current into alternating current for an alternating current motor.

Various features of AC inverter designs incorporating the invention disclosed herein are more fully disclosed in the following U.S. Pat. applications, all of which are assigned to the assignee of the within U.S. Pat. application, and all of which are filed on even date with the within application for the U.S. Patent: "DC Bus Shorting Apparatus and Method for AC Inverter", Inventors, J. C. Guyeska, J. M. Liptak, R. W. Roof, Ser. No. 677,709, case No. HI-265, filed Dec. 4, 1984, abandoned in favor of Case No. HI-282, Ser. No. 009,010, filed Jan. 28, 1987, and issued as U.S. Pat. No. 4,720,776 on Jan. 19, 1988, all disclosures of which are incorporated hereby by reference; "Current Regulated Switching Regulator", Inventor, R. W. Roof, Ser. No. 677,729, Case No. HI-266, filed Dec. 4, 1984, abandoned in favor of Case No. HI-283, Ser. No. 009,044, filed Jan. 27, 1987, and allowed on June 3, 1988, all disclosures of which are incorporated herein by reference; "Regeneration Detector Circuit", Inventor, J. M Liptak, Ser. No. 677,785, Case No. HI-268, filed Dec. 4, 1984, abandoned in favor of Case No. HI-286, Ser. No. 140,867, filed on Jan. 6, 1988, and still pending, all disclosures of which are incorporated herein by reference.

BACKGROUND OF THE INVENTION

A long standing problem in alternating current (AC) inverter design for inverters supplying alternating current to an AC motor is the rise in DC bus voltage when the motor is in an overhauling condition, that is when the motor is generating electric power. The DC bus normally supplies DC power to the inverter. The electric power generated by the motor is delivered by the inverter to the DC bus during periods of motor overhauling. The energy delivered to the DC bus is stored in the bus capacitors, and therefore causes a rise in DC bus voltage. The rise in DC bus voltage can become serious when the rate at which electric power is delivered to the DC bus by the motor exceeds the maximum dissipation rate available to the bus. Under these conditions the DC bus voltage may rise dangerously high and cause damage to electrical components. Particularly, the DC bus voltage may exceed the voltage rating for semiconductor switches or the DC bus capacitors and thereby injure these components.

Methods in the prior art for controlling the DC bus voltage of an AC inverter for driving an AC motor during deceleration of the AC motor include freezing the frequency of the AC current delivered by the inverter to the motor. As the frequency delivered by the inverter decreases the motor decelerates. Regulators of the prior art detect DC bus voltage and freeze the frequency of the inverter when the DC bus voltage reaches a set point value. However, the DC bus voltage frequently overshoots its set point value when the inverter frequency is frozen. The overshoot in DC bus voltage occurs as a result of the slip characteristics of an AC motor. The slip characteristics of an AC motor arise because most AC motors run at a speed slightly less than synchronous speed under motoring conditions. And even though the inverter frequency is frozen at the frequency found when the DC voltage of the bus exceeds a set point value, the motor will continue to decelerate as a result of the slip characteristics to a speed less than the inverter frequency. This continued deceleration of the motor causes an additional increase in DC bus voltage and is therefore responsible for the overshoot of DC bus voltage from the set point voltage.

SUMMARY OF THE INVENTION

The invention solves the problem of DC bus voltage overshoot under conditions of an overhauling motor. The invention is a direct current bus voltage regulator for an alternating current inverter, where the inverter draws direct current from a DC bus, and the inverter supplies alternating current having a controllable frequency to an AC motor.

The alternating current frequency is controlled by a signal received through a precedence determining circuit. This circuit receives signals from a ramp generator, an AC current limiting circuit and a DC bus voltage sensing circuit. The precedence determining circuit passes the signal with the highest priority on to a voltage control oscillator which in turn controls the AC current frequency delivered to the AC motor, thereby controlling the motor speed. The ramp generator signal indicates an operator input motor control command and has the lowest priority of the three signals. The AC current limiting circuit has second priority and indicates that current flow between the inverter and the AC motor is greater than a predetermined current value. The DC bus voltage signal, which has the highest priority, indicates the presence of a DC bus voltage greater than a predetermined value of DC bus voltage. The precedence determining circuit permits the DC bus voltage signal to have first priority in controlling the motor speed during deceleration or overhauling when the motor tends to generate electric power. The electrical power generated by the motor during deceleration is fed back into the DC bus and stored in the DC bus capacitors. If the DC bus voltage increases to a value greater than a predetermined safe value, electrical components of the motor control device may be damaged. By permitting the DC bus voltage signal to have the highest priority in controlling motor speed, it can override the signals of the ramp generator and the AC current limiter. This will allow the DC bus voltage signal to increase the motor speed slightly when the DC bus voltage exceeds the predetermined value. The increase in speed permits the excess voltage to be consumed by the motor, thereby reducing the chance of damage to electrical components of the motor control device.

The invention has means for detecting furthermore, the DC voltage of the DC bus, and means for comparing the DC voltage of the DC bus with a set point voltage. The invention also has means responsive to the DC voltage of the DC bus for raising the frequency of the alternating current when the motor generates electric power and the electric power is delivered to the DC bus, and the DC voltage of the DC bus exceeds the set point voltage.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

Figure 1:
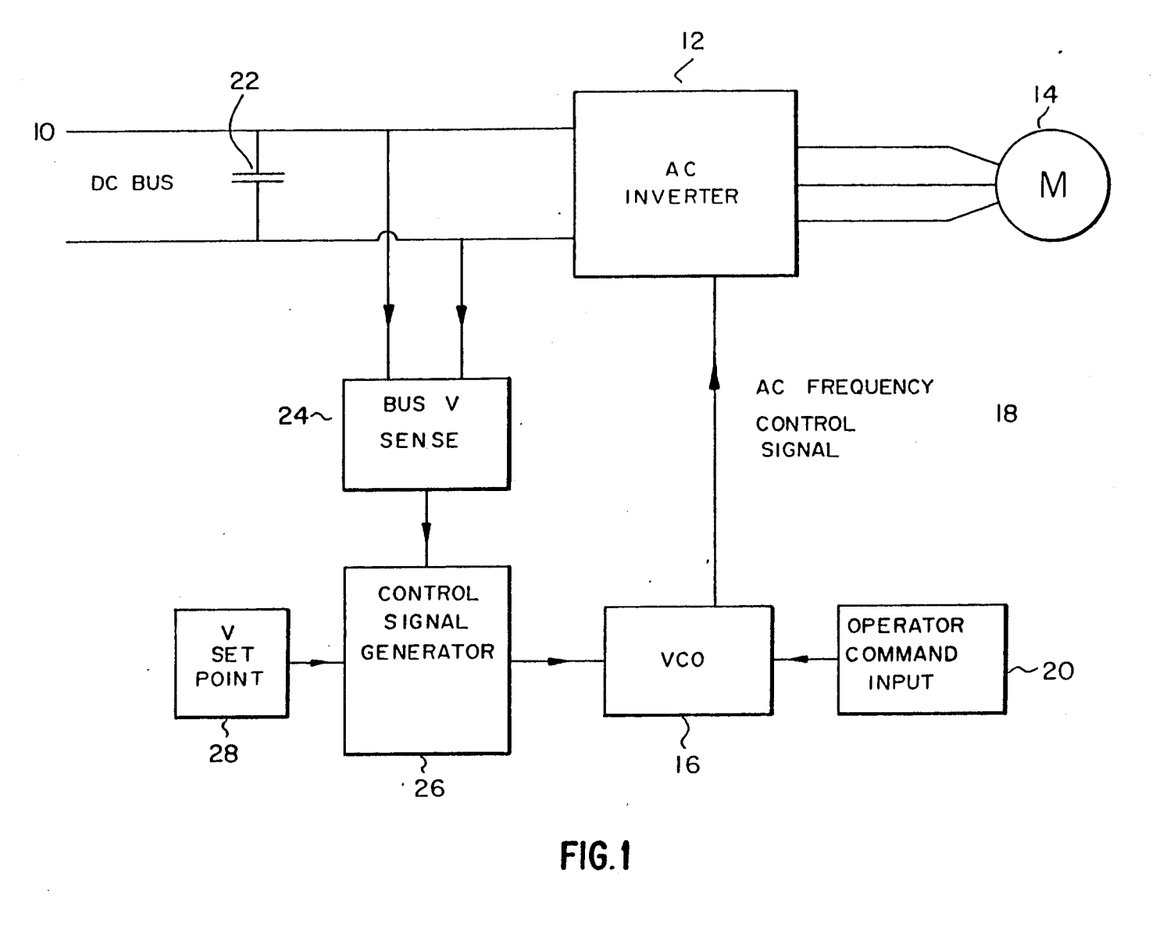
FIG. 1 is a block diagram showing a DC bus voltage bus regulator according to the invention.

Referring to FIG. 1, direct current (DC) bus 10 supplies direct current as input power to alternating current (AC) inverter 12. AC inverter 12 supplies AC current to motor 14. Voltage controlled oscillator 16 produces AC frequency control signal 18 which controls the output frequency of AC inverter 12. AC current having a frequency controlled by VCO 16 is supplied to motor 14 by inverter 12. The frequency at which voltage controlled oscillator 16 operates is controlled by operator command input 20. For example, a person who serves as an operator of motor 14, and all controls associated with motor 14, determines the speed at which he desires motor 14 to operate. The operator then inputs a desired speed through adjustment of operator command input 20. Alternatively operator command 20 may be controlled by a computer, or may be an element in a larger control system.

In situations where it is desired by the operator to decrease the speed of motor 14, the operator inputs a command to operator command input 20 requiring motor 14 to decrease in speed. Operator command input 20 lowers the frequency at which voltage controlled oscillator 16 produces AC frequency control signal 18. In certain situations motor 14 generates electric current as motor 14 decelerates. The electric current generated by motor 14 during deceleration is delivered by AC inverter 12 to DC bus 10. The DC current delivered by motor 14 to DC bus 10 causes charging of bus capacitor 22 and a consequent voltage rise on DC bus 10. The mechanical energy dissipated by motor 14 in slowing to its lower desired speed is converted into electrical energy stored in capacitor 22 according to the relationship:

$$\tfrac{1}{2}CV^2 = \tfrac{1}{2}Jw^2 - Losses$$

In the expression. J represents the moment of inertia of the motor and its load, w represents the angular speed of the motor, C represents the capacitance of capacitor 22, and V represents the DC bus 10 voltage. "Losses" include friction losses, windage losses, inverter losses and other losses which result in dissipation of mechanical energy.

In operation as DC bus 10 voltage rises bus voltage sense circuit 24 measures DC bus 10 voltage, and delivers a signal to control signal generator 26. Control signal generator 26 compares a DC bus 10 voltage set point, determined by voltage set point 28 with the voltage appearing across DC bus 10. When the voltage appearing across DC bus 10 exceeds the voltage set point determined by bus set point 28, control signal generator 26 supplies a signal to voltage controlled oscillator 16 increasing the frequency of AC frequency control signal 18. The increase in AC frequency control signal 18 causes motor 14, through AC inverter 12, to increase its speed slightly. The increase in speed of motor 14 gives energy stored in capacitor 22 an opportunity to be dissipated and the voltage on DC bus 10 to decrease. The energy stored in capacitor 22 is dissipated by, for example, a resistive load, or by some other means such as, for example, being converted into alternating current and delivered to an alternating current electric power line (not shown). Motor 14 will gradually decelerate until it reaches the operator commanded lower speed as rotational energy is dissipated through both frictional losses and dissipation of electrical energy generated by motor 14.

Therefore, control signal generator 26, by comparing the voltage appearing across DC bus 10 with the voltage provided by voltage set point 28, controls the frequency of AC frequency control signal 18 in order to prevent DC bus 10 voltage from exceeding the set point. In practical apparatus it is important to prevent the DC bus voltage from exceeding a set point in order to prevent applying excessive voltage to components such as semiconductor switches capacitor 22. Excessive voltage applied to semiconductor switches or capacitor 22 can cause their breakdown and disintegration.

Figure 2A:
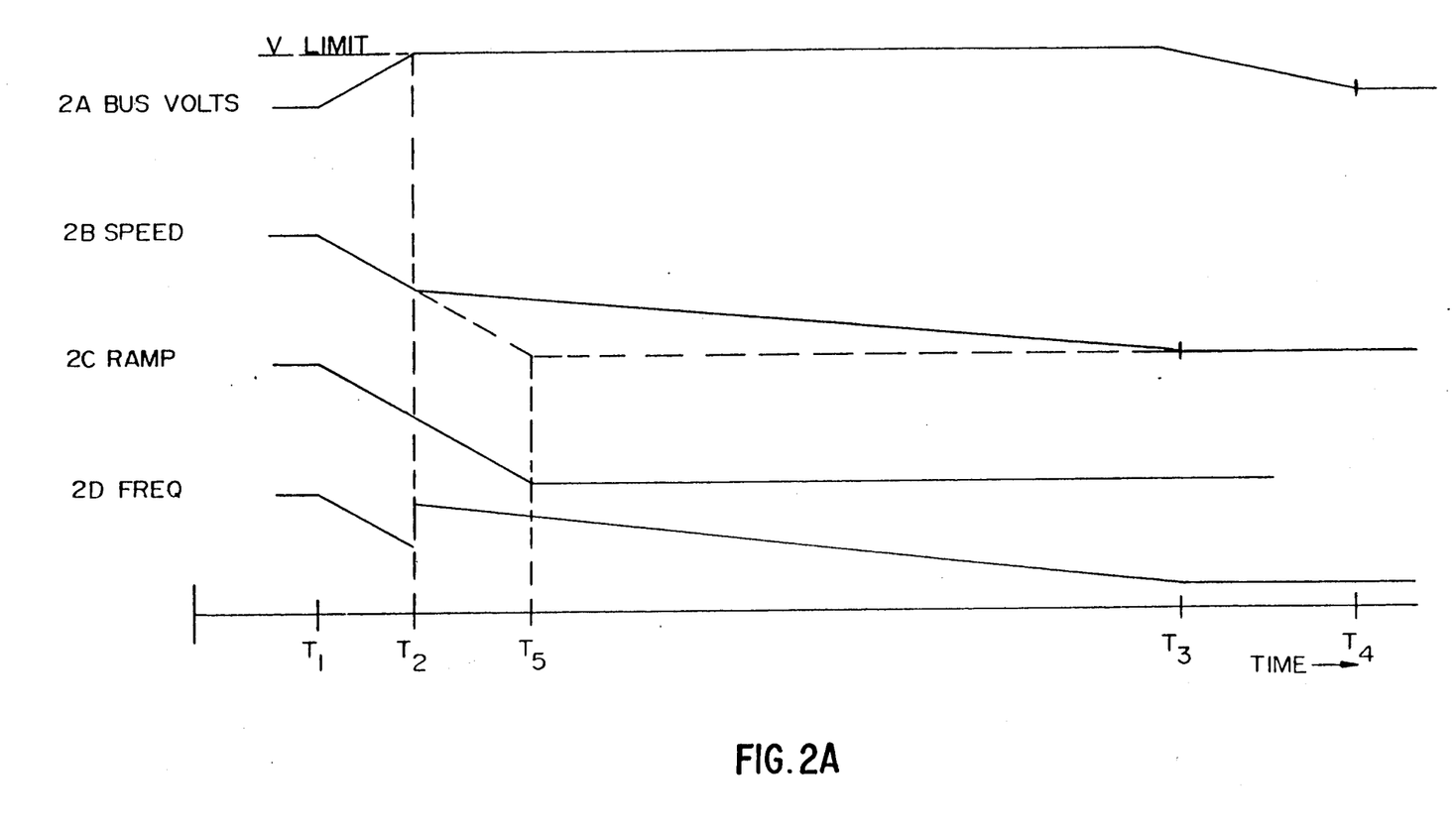
FIGS. 2a and 2b are a set of graphs.
Figure 2B:
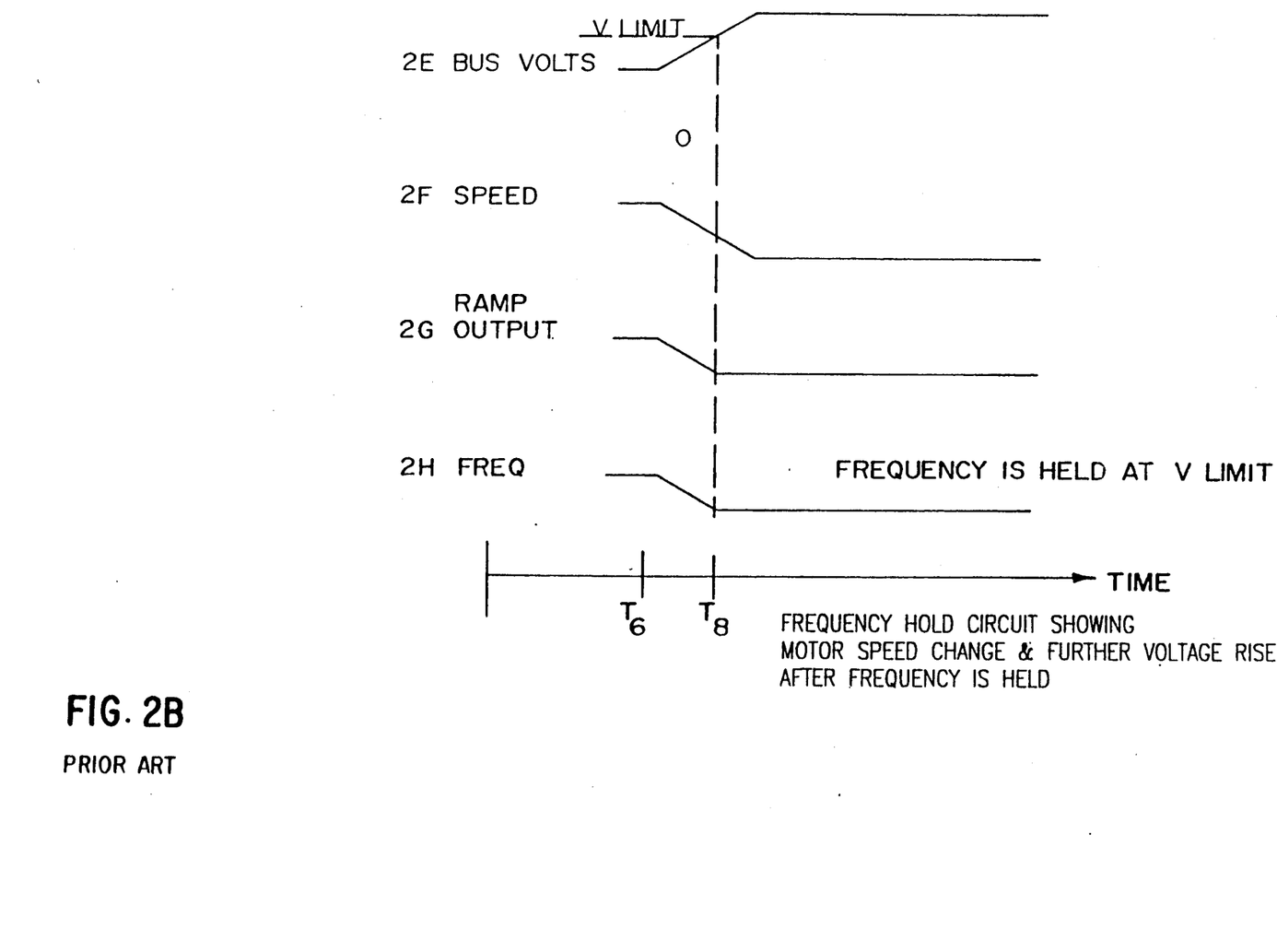

FIG. 2 is a series of graphs which show operation of the apparatus shown in FIG. 1. Graph 2A shows DC bus 10 voltage. A voltage limit is shown. Time is plotted along the horizontal axis as indicated by the arrow below graph 2D. The speed of motor 14 is shown in graph 2B. A ramp signal output by operator command input 20 to voltage controlled oscillator 16 is shown in graph 2C. The frequency of AC frequency control signal 18 output by voltage controlled oscillator 16 is shown in graph 2D. At time T1 an operator inputs a command to operator command input 20 requiring motor 14 to decelerate. The ramp voltage shown in graph 2C immediately responds, and begins decreasing in order to decrease the frequency of AC frequency control signal 18. The frequency of AC frequency control signal 18 begins decreasing at time T1, as is shown by graph 2D. Immediately the speed of motor 14 begins decreasing at time T1 as shown by graph 2B. Also, DC bus 10 voltage begins increasing at time T1 as shown by graph 2A because the rotational energy stored in motor 14, and any load attached to motor 14, is converted into electrical energy stored in bus capacitor 22. Also electrical energy is dissipated by the DC bus dissipation apparatus (not shown). DC bus 10 voltage reaches its upper set point limit at time T2. At time T2 control signal generator 26 senses that the DC bus voltage has reached its set point limit and commands voltage controlled oscillator 16 to increase the AC frequency of AC frequency control signal 18, as shown at time T2 in graph 2D. The increase in frequency of AC frequency control signal 18 is sufficient to maintain DC bus 10 voltage constant, as is shown in graph 2A at times later than T2. The ramp output signal of operator command input 20 continues to decrease after time T2 in response to the command input by the operator. However, the voltage controlled oscillator does not respond to this continually decreasing signal, but rather that signal is overridden by the output of control signal generator 26. Motor 14 slowly decelerates under the influence of both its frictional losses and dissipation of electrical energy generated by motor 14, as is shown by graph 2B as the speed slowly decreases beyond time T2. The speed of motor 14 continues decreasing as shown in graph 2B, and it decreases at a rate governed by losses until it finally reaches, at time T3, the speed to Which it was commanded to reach by deceleration. After time T3 the speed of motor 14 becomes constant. The ramp shown in graph 2C reaches the value necessary to maintain motor speed at its constant value much earlier than time T3, that is at time T5. The ramp voltage remains constant from time T5 forward. In the absence of the invention motor speed would follow the dashed curve 2BD and the bus voltage would overshoot the set point limit. The frequency shown in graph 2D decreases slowly as motor speed 2B decreases thereby maintaining bus 10 voltage constant as shown in graph 2A. After time T3, DC bus 10 voltage as shown in graph 2A begins decreasing until time T4, at which time it reaches its normal working value. DC bus 10 voltage remains at its normal working value at times beyond T4. The frequency shown in graph 2D of AC frequency control signal 18 continues slowly decreasing from time T2 until time T3 as required by motor speed. Thus, the frequency produced by voltage controlled oscillator 16 decreases slowly, and the rate of decrease is controlled by the frictional losses and electrical generation losses of motor 14 as it decelerates.

Therefore, control signal generator 26 permits motor 14 to decelerate at the rate provided by frictional and load losses with the provision that the voltage on DC bus 10 does not exceed a voltage set point. Motor 14 is allowed therefore to decelerate safely at a maximum deceleration rate without injury to semiconductor switches, bus capacitor 22 or any other components which could be injured by high DC bus voltage.

Graphs 2E, 2F, 2G, and 2H in FIG. 2 show a prior art approach to DC bus 10 voltage regulation. At time T6 an operator gives a command to the voltage controlled oscillator to decelerate the motor. The ramp output then drops at a predetermined rate toward the commanded value. The DC bus voltage begins rising at time T6 and reaches a voltage limit at time T8. The ramp output is then frozen at a fixed frequency at time T8 as shown in graph 2G. The speed of the motor continues to decrease beyond time T8 because of the slip characteristics of the AC motor. Because of the continued decrease in motor speed beyond time T8 the DC bus 10 voltage continues rising beyond the voltage limit as shown in graph 2E at times beyond T8. Thus, the prior art method of controlling DC bus 10 voltage during a deceleration period of motor 14 by freezing the output frequency of the voltage controlled oscillator does not achieve the desired goal. Because of slip characteristics of motor 14, the speed of motor 14 will undershoot the value chosen by freezing the frequency and the voltage on the DC bus will overshoot the set point limit.

Figure 3:
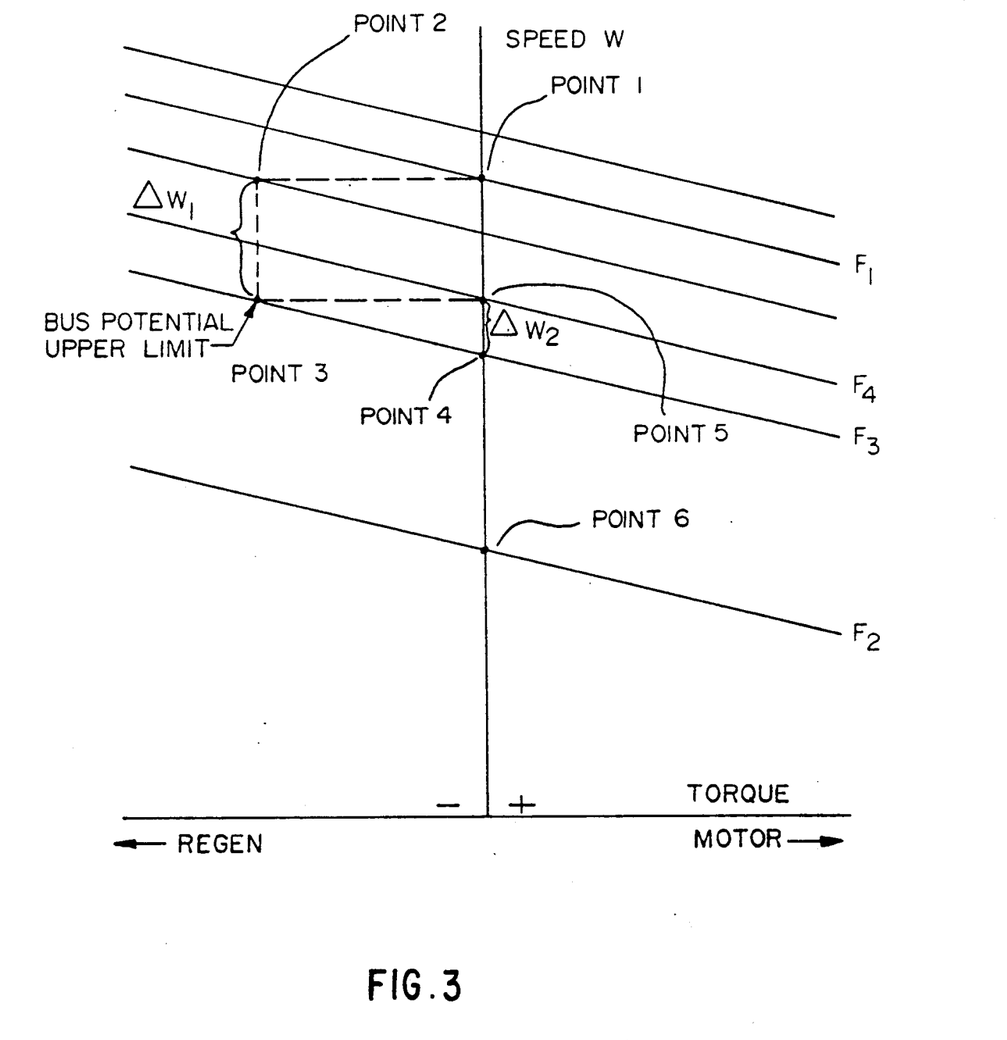
FIG. 3 is a graph showing operating characteristics of a motor.

FIG. 3 is a graph showing operating characteristics of an AC motor. FIG. 3 shows why the prior art method of freezing the frequency of the voltage controlled oscillator at the time that the DC bus voltage exceeds a threshold set point value causes the DC bus voltage to overshoot the set point value. Referring to FIG. 3, plotted along the horizontal axis of FIG. 3 is motor torque. Plotted along the vertical axis of FIG. 3 is motor speed w. Curves of motor speed for fixed frequency of drive by AC inverter 12 are shown as sloped lines intersecting the vertical speed axis. The slope of the curve of speed versus frequency is caused by motor slip. Motor slip is the phenomenon of an AC motor operating at a speed slightly different from the synchronous frequency, that is the frequency provided by AC inverter 12. The motor runs slightly slower than synchronous speed When operating under conditions of positive torque. Under conditions of negative torque, the speed of motor 14 will be slightly in excess of the synchronous speed, as is shown by the slope of the fixed frequency curves in FIG. 3.

As an illustrative example, a motor operating at say zero torque at a frequency F1 is shown at point number 1 on FIG. 3. A command to reduce motor speed to frequency F2 is given to operator command input 20. The voltage controlled oscillator reduces the voltage of AC frequency control signal 18 and the motor moves into the negative torque region illustrated by point 2 in FIG. 3. The motor begins deceleration until the bus potential upper limit is reached at point 3, as shown at time T8 in FIG. 2 in graph 2E. The frequency according to the prior art, is then frozen at frequency F3. The motor will move to a stable operating point at frequency F3 at point 4 as shown in FIG. 3. The additional speed reduction delta $W_2$ that the slip characteristics of motor 14 cause, produces mechanical rotational energy conversion into electrical energy which is stored in bus capacitor 22. This increased electrical energy storage in bus capacitor 22 causes DC bus 10 voltage to overshoot the bus potential upper limit set point.

According to the invention, the frequency of the AC frequency control signal 18 will be increased to a value F4 in order to maintain motor speed constant, and consequently to maintain the DC bus voltage at the upper limit set point. Thus the motor will operate at point 5 in FIG. 3. The operator command to decelerate commanded the frequency to reduce to frequency F2 as shown on FIG. 3. The ramp voltage decreases to a value corresponding to frequency F2. The motor speed and the frequency of AC frequency control signal 18 will decrease slowly until the frequency F2 is reached as shown in graphs 2B and 2D of FIG. 2. The time at which the speed reaches the commanded value F2 is indicated as time T3 in FIG. 2. At T3 the motor will be operating at point 6, FIG. 3.

Figure 4:
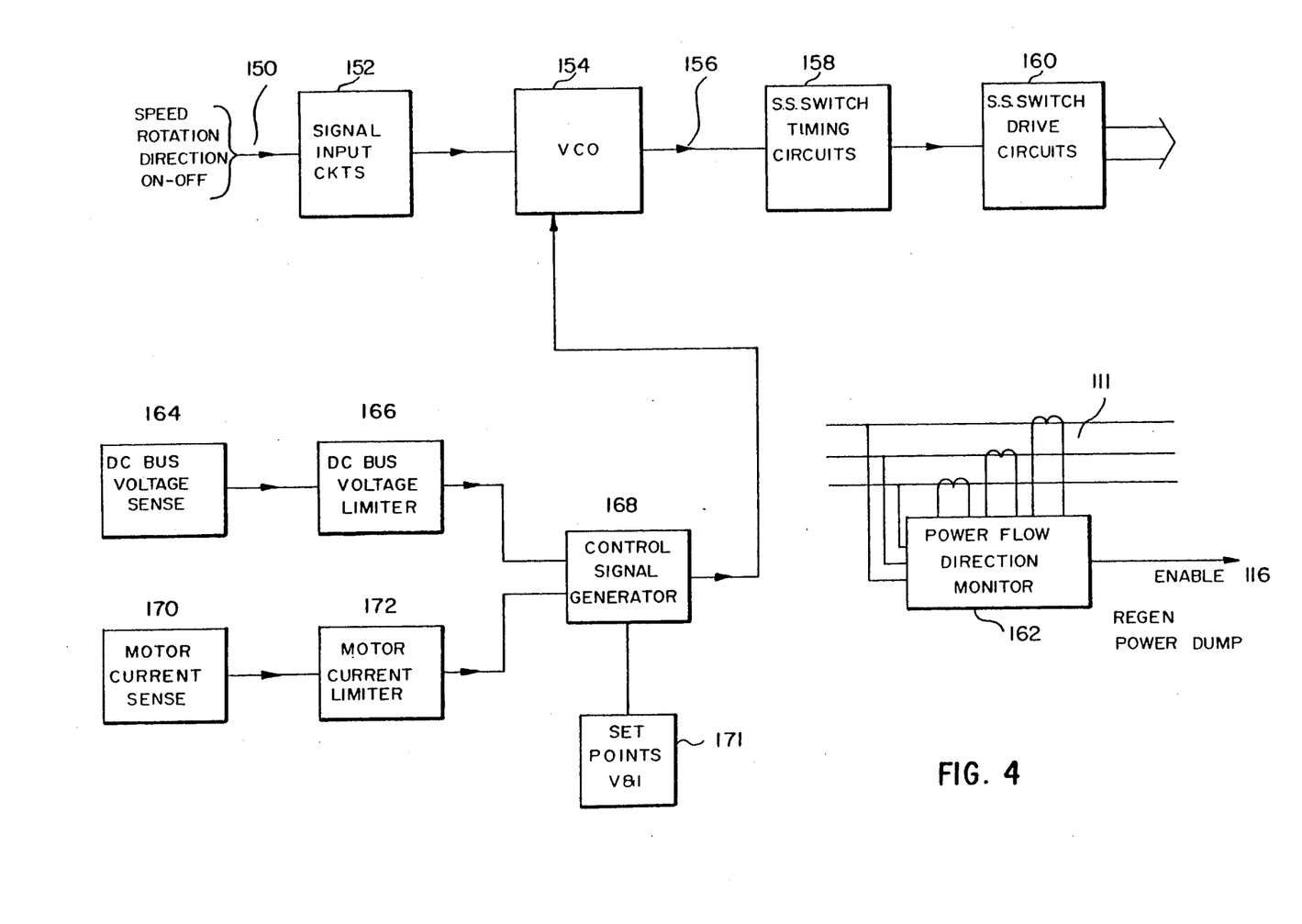
FIG. 4 is a block diagram showing an inverter control circuit.
Figure 5:
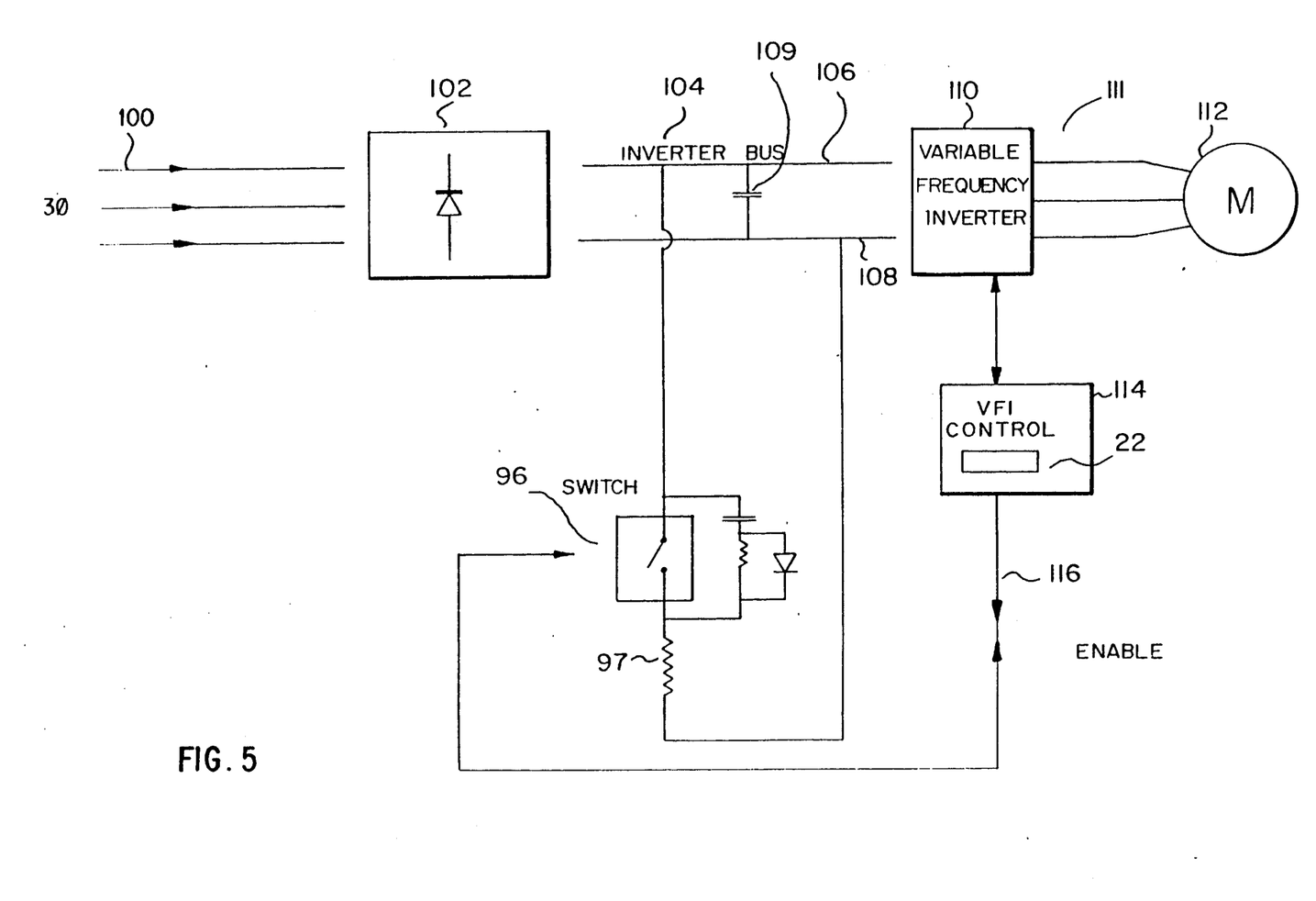
FIG. 5 is a block diagram of an inverter according to the invention.
Figure 6:
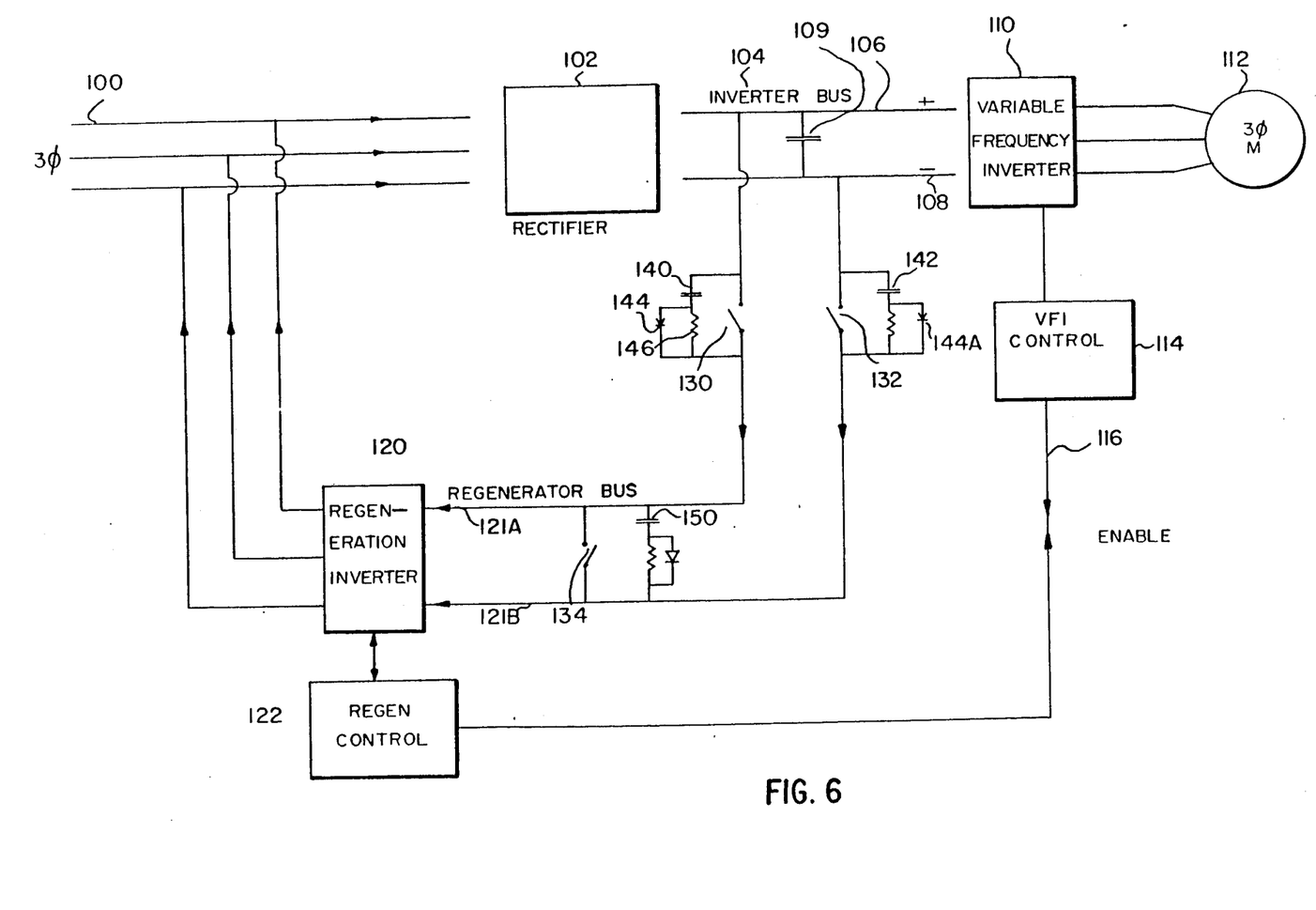
FIG. 6 is a block diagram of an inverter according to the invention.

FIG. 4, FIG. 5 and FIG. 6 show the invention in use in a variable frequency inverter. In. FIG. 5 and in FIG. 6, three phase AC power line 100 delivers electrical power to rectifier 102. Rectifier 102 delivers DC electrical power to bus 104. Bus 104 has a positive conductor 106 and a negative conductor 108. DC bus 104 delivers electrical power to variable frequency inverter 110. Variable frequency inverter 110 delivers AC electrical power to motor 112 through conductors 111. VFI control 114 controls variable frequency inverter 110. During periods of regeneration by motor 112, VFI control 114 delivers an enable signal on line 116 to switch 96. Switch 96 closes and allows energy stored in bus capacitor 109 to dissipate in resistor 97. Switch 96 is protected by a capacitor, a resistor, and a diode from excessive rates of change of voltage as switch 96 closes and opens. Switch 96 is operated by an enable signal on line 116.

In. FIG. 6 enable signal 116 activates regen control 122. Regen control 122 controls regeneration inverter 120. Regeneration inverter 120 draws DC power from DC bus 104 and converts it into alternating current. The alternating current produced by regeneration inverter 120 is connected through conductors 123 to AC power line 100. Regeneration inverter 120 delivers the AC electrical power it generates to three phase AC power line 100. Switches 130, 132, and 134 provide positive turn off of solid state switches within regeneration inverter 120, thereby allowing regeneration inverter 120 to be commutated properly for delivery of AC power to three phase AC power line 100 at a substantially unity power factor. Capacitors 140, 150, and 142 protect their respective switches from excessive rate of change of voltage.

FIG. 4 is a block diagram showing internal apparatus in VFI control 114. Referring to FIG. 4, speed rotation, direction, and on/off signals, and other operator input signals, are provided through line 150 to signal input circuits 152. Signal input circuits 152 command voltage controlled oscillator (VCO) 154 to supply and AC signal in line 156 to solid state switch timing circuits 158. Solid state switch timing circuits 158 drive solid state switch drive circuits 160. Solid state switch drive circuits 160 then drive solid state switches in variable frequency inverter 110. Power flow direction monitor 162 monitors current flow between variable frequency inverter 110 and motor 112 by monitoring the potential and current flow within conductors 111. Power flow direction monitor 162 generates an enable signal on line 116 to indicate that power flow is traveling from motor 112 into inverter 110.

DC bus voltage sense circuit 164 monitors the voltage across DC bus 104. DC bus voltage is compared by DC bus voltage limiter 166 against an upper limit set point value. When DC bus voltage reaches the set point value a signal is delivered to control signal generator 168. Control signal generator 168 controls voltage controlled oscillator 154 in order to increase the output frequency of voltage controlled oscillator 154 and thereby prevent the voltage across DC bus 104 from exceeding the set point value. Motor current sense 170 is responsive to current flow to motor 112. Current flow to motor 112 is compared with a motor current set point by motor current limiter 172. Motor current limiter 172 drives control signal generator 168 which varies the frequency of voltage controlled oscillator 154 in order to prevent an excessive current flow to motor 112. Set points may be input to control signal generator 168 by an operator through set point input 171.

Figure 7:
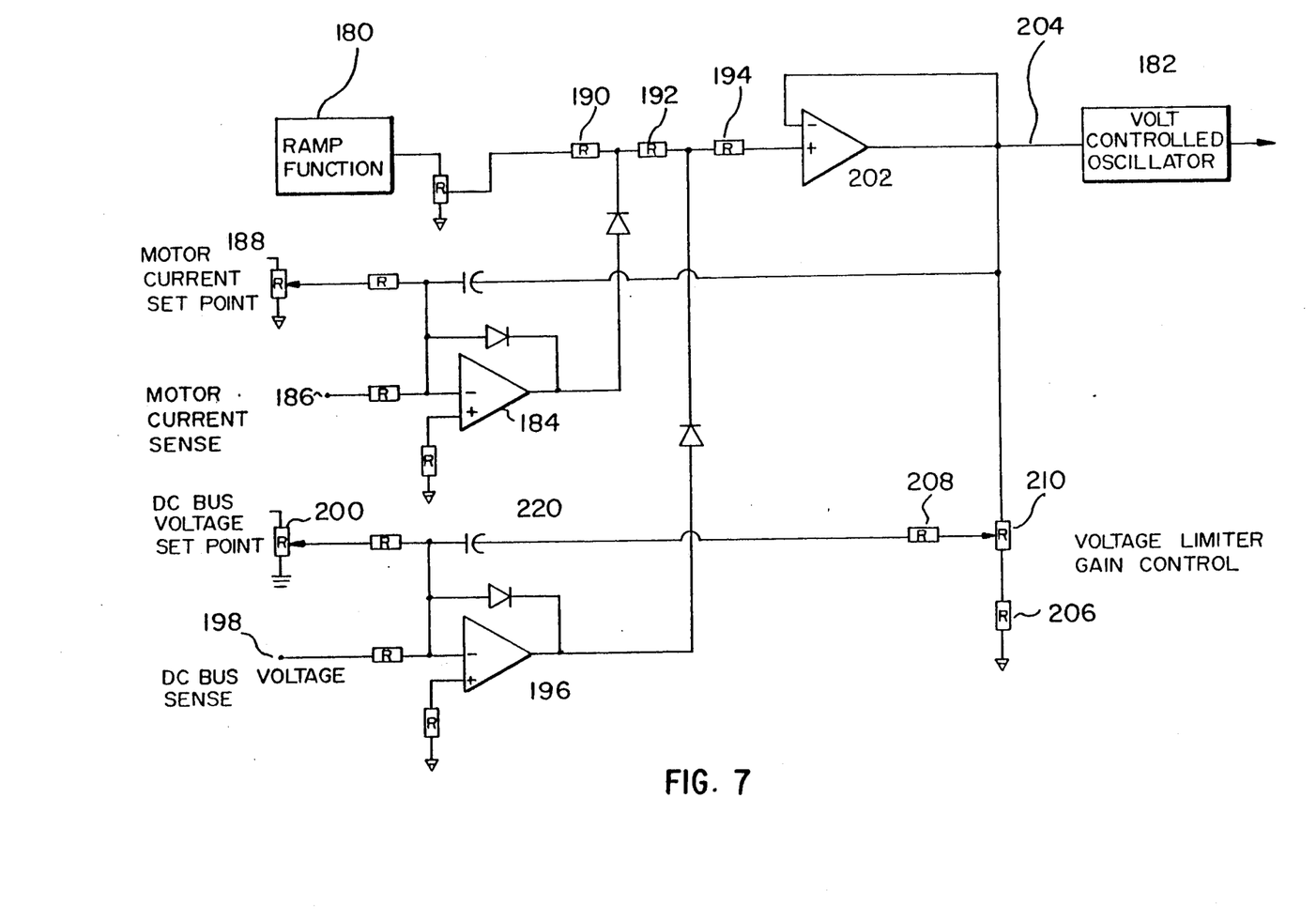
FIG. 7 is a schematic diagram of a DC bus voltage regulator according to the invention.

FIG. 7 is a partial schematic. Partial block, diagram of a control system for a DC bus voltage control, ramp function generator 180 generates the ramp voltage shown in graph 2C for application to voltage controlled oscillator (VCO) 182. The output frequency of VCO 182 increases as its input voltage on line 204 increases, and the output frequency decreases as its input voltage decreases. A current limiting circuit uses amplifier 184. A voltage proportional to motor current is applied at terminal 186. Terminal 186 connects through a resistor to the negative input terminal of amplifier 184. A current set limit is provided by variable resistor 188. When the voltage at terminal 186 exceeds the voltage supplied at the tap on variable resistor 188 the potential applied to the negative terminal of amplifier 184 changes and the output of amplifier 184 provides a signal to raise the frequency of voltage controlled oscillator 182. The output of amplifier 184 is connected to a precedence determining circuit made up of resistors 190, 192, and 194 and diodes 187 and 197.

A DC bus voltage limiter uses amplifier 196. A voltage proportional to the DC bus voltage is applied at terminal 198. A DC bus voltage set point is provided by variable resistor 200. When the signal provided at terminal 198 indicates that the DC bus voltage has exceeded the desired set point, then the voltage applied at terminal 198 combined with the voltage provided by the variable tap on resistor 200 causes the output of amplifier 196 to increase. The output of amplifier 196 connects to the precedence determining circuit made up of resistors 190, 192, and 194 and diodes 187 and 197. Amplifier 202 is a unity gain amplifier providing impedance matching to voltage controlled oscillator 182. The output signal of the DC voltage amplifier 196 has first priority for controlling the oscillator 182 and therefore overrides the output of the ramp function generator 180 and the motor current limiter amplifier 184. This is accomplished by the ability of the precedence determining circuit resistors 190 and 192 to limit the output signals of the ramp function generator 180 and motor current limiting amplifier 1984 while diode 187 reduces the impedance to the Dc bus voltage signal produced by the DC bus voltage amplifier 196 thereby allowing the DC bus voltage signal to override the ramp generator signal and the AC current limiting signal. Thus, even though the ramp function generator 180 may decrease its voltage output, as shown in graph 2C in FIG. 2, and the current limiting amplifier 184 may decrease the frequency of the Ac current delivered to the motor 112, as shown at time T1 in graph 2D in FIG. 2, the input signal 204 to voltage controlled oscillator 182 will be determined by the DC bus voltage limiting amplifier 196. Resistors 206, 208, and variable resistor 210 determine the DC bus voltage limiter feedback circuit gain. Also, the time constant of the bus voltage feedback circuit using amplifier 196 is determined by capacitor 220 and resistors 208, 210, and 206.

Similarly, the motor current limiting amplifier 184 has second priority in controlling the oscillator 182 and thereby overrides the ramp function generator output through connection with the precedence determining circuit made up of resistors 190, 192, and 194 and diodes 187 and 197. This is accomplished by the ability of the precedence determining circuit resistor 190 to limit the signal of the ramp function generator 180 while the diode 187 provides reduced impedance to the motor current limiting signal produced by the motor current limiting amplifier 186 thereby allowing the motor current limiting amplifier signal to override the ramp generator signal. In the absence of overriding signals from amplifiers 184 and 196, ramp function generator 180 provides the input signal 204 to voltage controlled oscillator 182. The motor current limiter circuit using amplifier 184 is used to prevent excessive motor currents. That is, as the motor current increases, amplifier 184 decreases the frequency of the alternating current delivered to motor 112 in order to limit excessive currents through motor 112.

In the absence of overriding signals from amplifiers 184 and 186, ramp function generator 180 provides the input signal 204 to voltage controlled oscillator 182.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A direct current (DC) bus voltage regulator for an alternating current (AC) inverter of the type having,
   an inverter drawing direct current from a DC bus and supplying alternating current having a controllable frequency to an AC motor,
   a frequency control signal to control said controllable frequency,
   a ramp signal to change said frequency control signal, indicative of an operator input motor control command,
   a DC bus voltage signal indicative that said DC bus voltage exceeds a predetermined value of DC voltage,
   an AC current signal indicative that said current flow between said inverter and said motor exceeds a predetermined value of current flow,
   comprising,
   means, having an input and an output and responsive to said ramp signal, said DC bus voltage signal, and said AC current signal, for generating a control signal;
   circuit means for determining a precedence amongst said ramp, DC bus voltage and AC current signals having an output connected to the input of said control signal generator means wherein said DC bus voltage signal, when present, has first priority over both said ramp signal and said AC current signal as an input to said control signal generating means and in the absence of said DC bus voltage signal, said AC current signal has priority over said ramp signal as an input to said control signal generating means; and,
   a voltage controlled oscillator means, having an input connected to the output of said control signal generating means and responsive to said frequency control signal, for generating an AC frequency control signal as an output signal, and said inverter receiving said AC frequency control signal for raising or lowering said frequency of said alternating current supplied by said inverter according to said frequency control signal received from said precedence determining circuit.

2. The apparatus as in claim 1 further comprising:
   an operational amplifier having inputs electrically connected across said DC bus to generate said DC bus voltage signal.

3. The apparatus as in claim 1 further comprising:
   an operational amplifier having an input connected to both a set point voltage and a conductor of said DC bus to generate said DC bus voltage signal.

4. The apparatus as in claim 1 further comprising:
   a voltage controlled oscillator, and said frequency control signal is a control voltage level applied to an input of said voltage controlled oscillator, and said voltage controlled oscillator determines said frequency of said alternating current supplied by said inverter.

5. The apparatus as in claim 1 further comprising:
   a comparator for comparing a voltage proportional to said DC bus voltage with a set point voltage, and for producing an output when said voltage proportional to said DC bus voltage exceeds said set point voltage, said output capable of influencing said frequency control signal, thereby generating said DC bus voltage signal.

6. The apparatus as in claim 1 further comprising:
   an operational amplifier having a first input and a second input, said first input connected to a reference voltage, and said second input connected both to a voltage proportional to said DC bus voltage and connected to a set point voltage, so that when said voltage proportional to said DC bus voltage drives said second input above said reference voltage an output voltage of said operational amplifier changes, and said output voltage of said operational amplifier is capable of influencing said frequency control signal, thereby generating said DC bus voltage signal.

7. The apparatus as in claim 1 further comprising:
   a comparator for comparing a voltage proportional to current flow from said inverter with a set point voltage, and for producing an output voltage when said voltage proportional to current flow from said inverter exceeds said set point voltage, said output capable of influencing said frequency control signal, thereby generating said AC current signal.

8. The apparatus as in claim 1 further comprising:
   an operational amplifier having a first input and a second input, said first input connected to a reference voltage, and said second input connected both to a voltage proportional to current flow from said inverter and connected to a set point voltage, so that when said voltage proportional to current flow from said inverter drives said second input terminal above said reference voltage, an output voltage of said operational amplifier changes, and said output of said operational amplifier is capable of influencing said frequency control signal, thereby generating said AC current signal.

9. A direct current (DC) bus voltage regulator for an alternating current (AC) inverter of the type having, an inverter drawing direct current from a DC bus and supplying an alternating current having a controllable frequency to an AC motor, comprising:
   means for generating a frequency control signal to control said alternating current frequency,
   means for generating a ramp signal to change said frequency control signal, indicative of an operator input motor control command,
   means for generating a DC bus voltage signal indicative that said DC bus voltage exceeds a predetermined value of DC bus voltage, said DC bus voltage signal generated by a high gain active voltage amplifier,
   an AC current signal indicative that said current flow between said inverter and said motor exceeds a predetermined value of current flow, said AC current signal generated by a high gain active current amplifier,
   a precedence circuit means for determining the order that signals are given priority including a first resistor, a second resistor, a third resistor, a first diode and a second diode, said first resistor having a first end connected to said ramp signal and a second end connected to a first end of said second resistor, and said connection between said first resistor and said second resistor also connected to a first end of said first diode, said first diode also having a second end connected to said AC current signal,
   said third resistor having a first end connected to a second end of said resistor and said connection and said connection between said second and said third resistors also connect to a first end of said second diode, said second diode also having a second end connected to said DC bus voltage signal, said third resistor having a second end electrically connected to a unity gain buffer amplifier, the output of which is the input to a voltage control oscillator providing said frequency control signal, said precedence determining circuit means establishes the priority of the input signal for said unity gain amplifier form said ramp signal, said AC current signal, and said DC bus voltage signal.

10. A device as claimed in claim 9 wherein said DC bus voltage signal has first priority, said AC current limiter signal has second priority, and said ramp generator signal has third priority for controlling said voltage controlled oscillator and thereby controlling said AC current frequency.

11. A direct current (DC) bus voltage regulator for an alternating current (AC) inverter capable of supplying alternating current having a controllable frequency to an AC motor, where the AC motor is capable of supplying electrical energy to the DC bus during regeneration, comprising:
means, responsive to a frequency control signal, for supplying a variable frequency alternating current voltage;
means for generating a voltage ramp signal to generate a voltage ramp signal;
a comparator for said DC bus voltage for comparing a voltage proportional to said DC bus voltage with a set point voltage, and having an output capable of influencing said frequency control signal;
a comparator for current flow from said inverter for comparing a voltage proportional to current flow between said inverter and said motor to a set point voltage, and having an output capable of influencing said frequency control signal;
means, responsive to said output of said first comparator and responsive to said output of said second comparator, for generating said frequency control signal, and said comparator for said DC bus voltage is capable of overriding said ramp signal and said comparator for said current flow so that said comparator for said DC bus voltage controls said DC bus voltage when said DC bus voltage exceeds said predetermined value of DC bus voltage; and,
means, responsive to said frequency control signal, for raising said frequency of said alternating current when said motor generates electric power and said electric power is delivered to said DC bus, and said DC voltage of said DC bus exceeds said predetermined value of DC bus voltage.

12. An improved direct current (DC) bus voltage regulator for an alternating current (AC) inverter capable of supplying alternating current having a controllable frequency to an AC motor, where the AC motor is capable of supplying electrical energy to the DC bus during regeneration, having;
means, responsive to a frequency control signal, for supplying a variable frequency alternating current voltage; and having an input such that a frequency control signal applied to said input determines said frequency of said output voltage;
means for generating a voltage ramp signal to generate a voltage ramp signal;
means, responsive to a DC bus voltage, for generating a first control signal indicative that said DC bus voltage exceeds a predetermined value of DC bus voltage;
means, responsive to a flow of AC electric current between said inverter and said motor, for generating a second control signal indicative that said current flow between said inverter and said motor exceeds a predetermined value of current flow;
wherein the improvement comprises:
means, responsive to said voltage ramp signal, said first control signal, and said second control signal, for generating said frequency control signal, and said means for generating said frequency control signal having said first control signal take precedence over both said voltage ramp signal and said second control signal, and said precedence of said first control signal permitting control by said DC bus voltage to override said ramp signal and said second control signal when said DC bus voltage exceeds said predetermined value of DC bus voltage; and,
means, responsive to said frequency control signal, for raising said frequency of said alternating current when said motor generates electric power and said electric power is delivered to said DC bus, and said DC voltage of said DC bus exceeds said predetermined value of DC bus voltage.

13. A direct current (DC) bus voltage regulator for an alternating current (AC) inverter of the type having an inverter drawing direct current from a DC bus and supplying alternating current having a controllable frequency to an AC motor, comprising:
means for generating a ramp signal to change said frequency, indicative of an operator input motor control command,
means for generating a DC bus voltage signal indicative of said DC bus voltage,
an AC current signal indicative of Ac current flow between said inverter and said motor supplied by said inverter,
a voltage controlled oscillator means having inputs from the ramp, DC bus voltage and AC current signal means for generating an AC frequency control signal to said inverter to generate said frequency; and
a precedence circuit means for determining the priority of said ramp signal, said AC current signal, and said DC bus voltage signal, said precedence determining circuit means sensing said DC bus voltage signal when present to override both said ramp signal and said AC current signal, and in the absence of the DC bus voltage signal sensing said AC current signal when present to override said ramp signal, and passing said overriding signal when present or said ramp signal in the absence of said overriding signal to said voltage controlled oscillator.

14. The apparatus as in claim 13 where in said precedence determining circuit means further comprises:
a first resistor, a second resistor, a third resistor, a first diode, and a second diode, said first resistor having a first end connected to said ramp signal and a second end connected to a first end of said second resistor, and said connection between said first resistor and said second resistor also connected to a first end of said first diode, said first diode also having a second end connected to said AC current signal,
said third resistor having a first end connected to a second end of said second resistor and said connection between said second and said third resistor also connected to a first end of said second diode, said second diode also having a second end connected to said DC bus voltage signal,
said third resistor having a second end electrically connected to said voltage controlled oscillator and providing said frequency control signal.

15. A device as claimed in claim 14 where in said first resistor impedes said ramp signal, said second resistor impedes said Ac current signal and said second diode reduces the impedance to said DC bus voltage signal thereby permitting said DC bus voltage signal to control said frequency generated by said voltage controlled oscillator by overriding said ramp signal and said AC current signal.

16. A device as claimed in claim 14 where in the absence of said DC bus voltage signal said first resistor impedes said ramp signal and said first diode reduces the impedance to said AC current signal permitting said AC current signal to control said frequency generated by voltage controlled oscillator by overriding said ramp signal.

17. A device as claimed in claim 14 wherein in the absence of said DC bus voltage signal and said AC current signal said ramp signal controls said frequency generated by said voltage controlled oscillator.

18. A direct current (DC) bus voltage regulator for an alternating current (AC) inverter of the type having
an inverter drawing direct current from a DC bus and supplying alternating current having a controllable frequency to an AC motor, comprising:
a ramp signal indicative of an operator input motor control command,
a DC bus voltage signal indicative of said DC bus voltage,
an AC current signal indicative of AC current flow between said inverter and said motor supplied by said inverter, a voltage controlled oscillator to generate said controllable frequency; and
a precedence determining circuit combining said ramp signal, said AC current signal, and said DC bus voltage signal, to cause said DC bus voltage signal when present, to override said ramp signal, when present, to override said ramp signal, and for passing the overriding signal when present or said ramp signal to said voltage controlled oscillator.

19. The apparatus as in claim 17 further comprising:
said isolation circuit causing said DC bus voltage signal overriding said AC current signal.

20. A direct current (DC) bus voltage regulator in an alternating current (AC) inverter,
said inverter selectively drawing direct current said supplying direct current to said bus, and selectively supplying alternating motor current to an AC motor,
said alternating motor current having a controlled variable frequency determined by said inverter,
said inverter selectively generating a ramp signal which determines the frequency control signal,
said inverter sensing the voltage of said DC bus and providing a DC bus voltage signal indicative that the voltage of said DC bus voltage exceeds a predetermined DC bus voltage,
said inverter sensing alternating motor current and providing an AC current signal indicative that the current magnitude of said alternating motor current exceeds a predetermined current magnitude,
said DC bus voltage regulator comprising:
frequency control generation means for generating said frequency control signal in selective response to said ramp signal, said DC bus voltage signal and said AC current signal; and
a precedence determining circuit means for directly receiving said ramp signal, said DC bus voltage signal, and said AC current signal and being operatively connected to said frequency control generation means for causing said frequency control generation means to respond only to said DC bus voltage signal when said DC bus voltage signal is present, and for causing said frequency control generation means to respond only to said AC current signal when AC current signal is present and said DC bus voltage signal is not present, and for causing said frequency control generation means to respond only to said ramp signal, when said DC bus voltage signal and said AC current signal are not present.

21. A device as claimed in claim 20 where in said precedence determining circuit comprises:
a. a first resistor which impedes said ramp signal when said AC current signal and/or said DC bus voltage signal is present;
b. a second resistor which impedes said AC current signal when said DC bus voltage signal is present;
c. a third resistor which connects said ramp signal, said AC current signal and said DC bus voltage signal to said frequency control generation means;
d. a first diode which in the absence of said DC bus voltage signal reduces impedance to said AC current signal when present, permitting said DC bus voltage signal to override said ramp signal, and;
e. a second diode which reduces impedance to said DC bus voltage signal when present, permitting said DC bus voltage signal to override said ramp signal and said AC current signal.

22. A direct current (DC) bus voltage regulator for an alternating current (AC) inverter of the type having, an inverter drawing direct current from a DC bus and supplying an alternating current having a controllable frequency to an AC motor, comprising:
a frequency control signal to control said frequency,
a ramp signal to change said frequency control signal,
a DC bus voltage signal indicative that said DC bus voltage exceeds a predetermined value of DC bus voltage, said DC bus voltage signal generated by a high gain active voltage amplifier,
an AC current signal indicative that said current flow between said inverter and said motor exceeds a predetermined value of current flow, said AC current signal generated by a high gain active current amplifier,
a first resistor, a second resistor, and a third resistor, said first resistor having a first end connected to said ramp signal and a second end connected to a first end of said second resistor, and said connection between said first resistor and said second resistor also connected to said AC current signal,
said third resistor having a first end connected to a second end of said resistor and said connection and said connection between said second and said third resistors also connect to said DC bus voltage signal,
said third resistor having a second end electrically connected to a unity gain buffer amplifier, the output of which is the input to a voltage control oscillator providing said frequency control signal, a voltage isolation diode conducting said DC bus voltage signal to said connection between said second and third resistors; and a current isolation diode conducting said AC current signal to said connection between said first and second resistors.

23. The bus voltage regulator of claim 9 wherein:

said DC bus voltage signal is generated by a high gain active voltage comparator; and said AC current signal is generated by a high gain active current comparator.

24. A direct current (DC) bus voltage regulator for an alternating current (AC) inverter of the type having, an inverter drawing direct current from a DC bus and supplying an alternating current having a controllable frequency to an AC motor, comprising;

a frequency control signal to control said frequency, a ramp signal to change said frequency control signal, a DC bus voltage signal indicative that said DC bus voltage exceeds a predetermined value of DC bus voltage, said DC bus voltage signal generated by a high gain active voltage amplifier, an AC current signal indicative that said current flow between said inverter and said motor exceeds a predetermined value of current flow, said Ac current signal generated by a high gain active current amplifier, a first resistor, a second resistor, and a third resistor, said first resistor having a first end connected to said ramp signal and a second end connected to a first end of said second resistor, and said connection between said first resistor and said second resistor also connected to said AC current signal, said third resistor having a first end connected to a second end of said resistor and said connection and said connection between said second and said third resistors also connect to said DC bus voltage signal, said third resistor having a second end electrically connected to a unity gain buffer amplifier, the output of which is the input to a voltage control oscillator providing said frequency control signal, said DC bus voltage signal is generated by a high gain active voltage comparator; and said AC current signal is generated by a high gain active current comparator.

* * * * *